May 8, 1956  D. W. JONES  2,744,539
CHECK VALVE
Filed Oct. 7, 1952
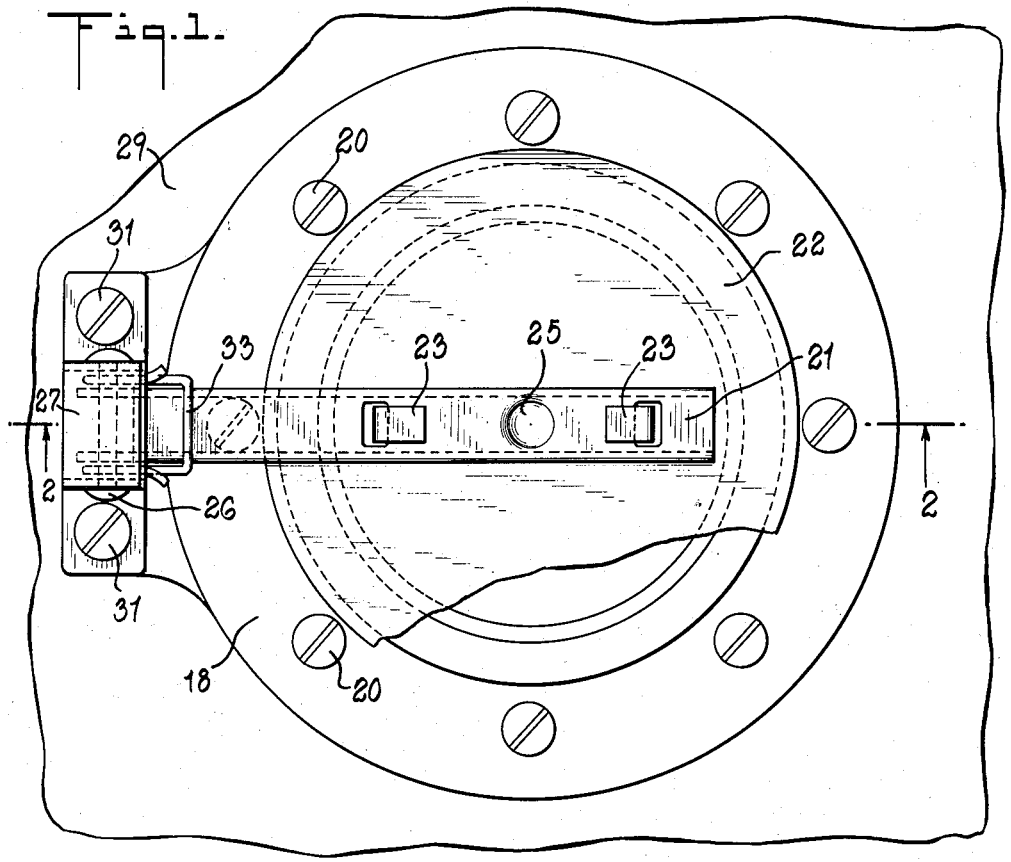
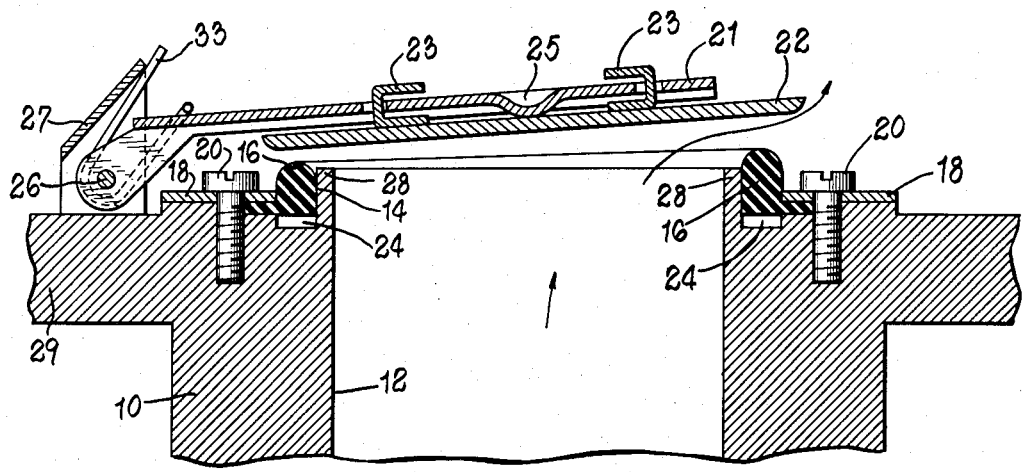
INVENTOR.
DAVID W. JONES
BY
Davis, Hoxie & Faithfull
ATTORNEYS

United States Patent Office 2,744,539
Patented May 8, 1956

2,744,539
CHECK VALVE

David W. Jones, Commack, N. Y., assignor to Kenyon Instrument Company, Inc., Huntington, N. Y.

Application October 7, 1952, Serial No. 313,535

7 Claims. (Cl. 137—527.4)

This invention relates to check valves and more particularly to flapper type valves such as are used in aircraft.

When dealing with fluid flow through pipes particularly as used in aircraft, the problem of preventing reverse flow, yet allowing unrestricted flow in the desired direction, has usually resulted in the use of a hinged flapper type of check valve. At very low pressures in the reverse direction during which it is desirable to have no leakage downstream, it has been difficult or impossible in valves as made heretofore to achieve minimum leakage with such fluids as gasoline or air, particularly at pressures below 2 lbs. per square inch which result in a very light seating force on the flapper thus making it difficult to obtain a leakproof seal between the flapper and its seat. At the same time, it is necessary to make sure that under steady high pressure conditions in the reverse direction, or during pressure transients such as are caused by sudden surges of incompressible liquids such as gasoline, there will be a minimum of deflection of the flapper that might tend to open up portions of seat seal and allow leakage.

Almost invariably for the above type of service, a rubber type of seat seal has been used. In some previous designs, the rubber has been fastened as a disc to the flapper; in others the seat is machined flat, a groove machined near the edge and an O ring inserted. Others have used the O ring installed in the flapper itself and closing on a flat seat. All these flapper designs as used heretofore have been subject to one or more serious limitations. Those seating on O rings are subject to low pressure leakage because of the manufacturing inequalities inevitable in an O ring. Those utilizing a rubber disc on the flapper are inclined towards cutting and abrading the rubber disc upon repeated operation which is a result of the necessarily semi-sharp seat machined into the seat body for the rubber disc to settle down upon. The latter also show tendencies to deflect downward sometimes passing through the hole to be closed and resulting in the rubber flapper disappearing downstream.

Another and perhaps the most common difficulty of the flapper type valve is that of aligning the seat with the hinge mechanism, or vice versa. For successful operation the hinge mechanism must be so precisely positioned upon assembly that there is no misalignment of the flapper as it is seated. To accomplish such precise positioning, the hinge location must be most accurately determined in a vertical direction and likewise must have its axis lying parallel to the seat.

Objects of this invention are to provide a check valve which will permit free flow of fluid in a forward direction while preventing the flow in the opposite direction, which has a minimum pressure drop in the forward direction, which closes with a minimum of back pressure, which is adapted for use over a range of extremely high to extremely low pressures, which seats tightly at all pressures, which has a minimum of leakage in the reverse direction, which prevents distortion of the flapper under high pressures, which does not abrade or cut the gasket, which incorporates a simple hinge which has a minimum of parts, which is economical to manufacture, and which advances the art generally.

According to the present invention the valve comprises a body having a passageway therein through which the fluid flows. A gasket is arranged circumjacent the body at one end of the passageway where it is supported by the body so as to come in contact with a flapper disc. The disc is attached by means of a lost motion connection to one end of an arm whose other end is pivotally attached to the body so that the arm does not interfere with the seating of the disc upon the gasket. The portion of the body beneath the effective portion of the gasket is undercut so that the gasket yields slightly to form a more effective seal when the disc comes into contact therewith under light reverse pressures. The sealing action under slight pressures is further augmented by providing a biasing spring for the arm, and progressively increasing the height of the gasket as it extends away from the arm pivot point. A stop, which is preferably in the form of a concentric ring positioned within said gasket with a height somewhat less than the normal uncompressed height of the gasket, is also provided to limit the compression of the gasket under high pressures so that it will not be permanently deformed or torn loose.

These and other objects and aspects will be apparent from the following description of the presently preferred embodiment of the invention which refers to a drawing wherein:

Fig. 1 is a plan view; and
Fig. 2 is a sectional view on line 2—2 of Fig. 1.

The check valve illustrated comprises a generally cylindrical body 10 having a central passageway 12 therethrough. The upper end of the body 10 is provided with a recess 14 which is disposed circumjacent the end of the passageway to receive a gasket 16 of a resilient material such as synthetic rubber. The gasket 16 has an L-shaped cross section so that the horizontal leg portion thereof will lie in the recess 14 where it is restrained by a clamp ring 18. A plurality of equally spaced holes are provided in the ring 18 for receiving cap screws 20 which engage threaded apertures in the end of the body 10 so that the gasket is supported with its other leg portion in a substantially vertical position.

The end of the passageway is closed by means of a flapper such as the disc 22 which engages the top of the vertical leg portion of the gasket 16. The disc 22 is loosely secured to one end of a channel-shaped arm 21 by means of lost motion connection consisting of two spaced U-shaped brackets 23 one leg of each of which is fastened to the top surface of the disc. The cross members of the brackets 23 extend upwardly through respective slots in the arm so that the brackets are free to slide with respect to the arm. The web of the arm 21 is deformed at a point 25 intermediate the bracket slots to form an embossment which bears against the center of the disc so that the disc pivots thereabout to take a position forming a tight seal as the bottom surface thereof contacts the top of the vertical leg portion of the gasket 16. The opposite end of the arm 21 is pivoted upon a pin 26 carried in the upright arms of a bracket 27 that is attached by screws 31 to a boss 29 extending outwardly from the body 10. The arm is provided with a small biasing force by means of a spring 33.

The portion of the body 10 forming the bottom of the recess 14 which is located immediately below the effective vertical leg portion of the gasket 16 is cut away as at 24 to provide a relief into which the gasket sinks upon initial contact with the disc 22 thereby helping to insure sealing at low back pressures. More effective sealing is also provided by gradually increasing the height of the vertical leg portion of the gasket as its distance from the pin 26 about which the disc 22 pivots increases so that its top edge lies in a plane disposed at an angle to the axis of the passageway whereby the disc seats simultaneously upon substantially all portions of the disc.

To prevent the gasket 16 from being abraded, torn or displaced at very high back pressures, the travel of the disc 22 towards the body 10 is limited by a stop in the form of a lip 28 formed integrally with and extending beyond the face of the end of the body circumjacent the passageway 12 so that the end of the lip comes into contact with the bottom surface of the disc 22 after a predetermined compression of the gasket 16.

The check valve is inserted in a pipe line in the usual manner, for example, by means of flanged or threaded connections (not shown). Fluid flow in the normal direction through the passageway 12, as indicated by the arrow, moves the disc 22 against force exerted by the spring 33 so that the disc leaves the gasket 16 to open the passageway. Fluid flow in the reverse direction tends to seat the disc 22 on the gasket 16 thereby blocking the passageway 12. At low pressures, the action of the spring 33, the varying height of the gasket 16, and the recess 24 beneath the gasket, all aid the back pressure in the seating of the disc 22 against the gasket 16 thereby to prevent leakage. At high pressures the disc 22 is forced against the lip 28 thereby precluding damage to the gasket or the loss thereof from the recess 14.

I claim:

1. A check valve for preventing the reverse flow of fluids comprising a body having a passageway therethrough which acts as a conduit for the fluid, a gasket of resilient material supported by said body circumjacent one end of said passageway, a disc which acts as a flapper for contacting said gasket to close the end of said passageway to prevent the flow of fluid therethrough, an arm having one end pivotally attached to said body, the opposite end of the arm having an embossment with a slot on either side thereof, two U-shaped brackets each having two substantially parallel leg members interconnected by a cross member which extends loosely through a respective slot, one leg member of each bracket being secured to said disc to bring the embossment into contact with the center of the disc thereby to form a lost motion connection between the opposite end of the arm and said disc so that the arm does not interfere with the seating of the disc upon the gasket.

2. A check valve according to claim 1 having a spring acting upon the arm to bias the disc against the gasket.

3. A check valve for preventing the reverse flow of fluids comprising a body having a passageway therethrough which acts as a conduit for the fluid, a recess in the end of said body concentrically disposed outside said passageway, a gasket having an L-shaped cross section one leg of which is located in said recess, a clamp ring having a plurality of cap screws extending therethrough to engage the end of the body thereby to restrain the gasket in said recess so that the top of the other leg forms an effective gasket portion which extends normally from the recessed end of said body, a disc which acts as a flapper for contacting said gasket to close the end of said passageway to prevent the flow of fluid therethrough, an arm having one end pivotally attached to said body, the opposite end of the arm having an embossment with a slot on either side thereof, two U-shaped brackets each having two substantially parallel leg members interconnected by a cross member which extends loosely through a respective slot, one leg member of each bracket being secured to said disc to bring the embossment into contact with the center of the disc thereby to form a lost motion connection between the opposite end of the arm and said disc so that the arm does not interfere with the seating of the disc upon the gasket, the effective portions of the gasket coming into contact with the disc being in a plane angularly disposed with respect to the passageway so that the disc seats upon all portions of the gasket simultaneously, the portion of the body beneath the effective portions of the gasket being undercut whereby the gasket yields slightly to form a more effective seal at low back pressures.

4. A check valve for preventing the reverse flow of fluids, which comprises a body having a passage therethrough acting as a conduit for the fluid, the body having in an end surface thereof a recess surrounding one end of the passage, a valve disc opposite said end of the passage and movable to open and close the passage, a gasket of resilient material in said recess and having an annular top surface engageable by the disc in its passage-closing position, said body forming an annular wall between said gasket and passage, and means supporting the gasket in said recess in spaced relation to the bottom thereof and with the disc-engageable portion of the gasket protruding beyond said annular wall and end surface of the body, said supporting means including a resilient element which allows displacement of the gasket along said annular wall to the bottom of the recess under pressure from the disc and returns the gasket to its normal protruding position upon release of said pressure.

5. A check valve according to claim 4, comprising also a pivotal mount for the disc located on the body at one side of said end surface, said disc-engageable portion of the gasket being in a plane angularly disposed with respect to said passage and inclined toward said pivotal mount, whereby the disc seats upon all portions of the gasket simultaneously.

6. A check valve according to claim 4, in which said resilient element is integral with the gasket and gives it an L-shaped cross-section, said supporting means also including a member clamping the leg formed by said resilient element against the body.

7. A check valve according to claim 4, in which the depth of the gasket, along part of its circumference, does not exceed the distance from said end surface to the bottom of the recess, whereby said end surface limits distortion of the gasket by the disc.

References Cited in the file of this patent

UNITED STATES PATENTS

| | | |
|---|---|---|
| 195,137 | Baw | Sept. 11, 1877 |
| 274,204 | Lawson | Mar. 20, 1883 |
| 701,607 | Park | June 3, 1902 |
| 1,003,179 | Gruschow | Sept. 12, 1911 |
| 1,125,606 | Tripp | Jan. 19, 1915 |
| 1,699,095 | Clark | Jan. 15, 1929 |
| 1,822,655 | Hamilton | Sept. 8, 1931 |
| 2,151,442 | Roberts | Mar. 21, 1939 |
| 2,233,081 | Keller | Feb. 25, 1941 |
| 2,274,776 | Cull | Mar. 3, 1942 |
| 2,334,278 | Mueller | Nov. 16, 1943 |
| 2,621,011 | Smith | Dec. 9, 1952 |
| 2,645,449 | Gulick | July 14, 1953 |

FOREIGN PATENTS

| | | |
|---|---|---|
| 30,711 | Germany | 1907 |